US012617544B2

(12) United States Patent
Lemay et al.

(10) Patent No.: US 12,617,544 B2
(45) Date of Patent: May 5, 2026

(54) METHOD FOR DETERMINING AT LEAST ONE POWER LIMIT OF A HYBRID DRIVE TRAIN FOR A TRANSPORT VEHICLE, IN PARTICULAR AN AIRCRAFT

(71) Applicant: SAFRAN HELICOPTER ENGINES, Bordes (FR)

(72) Inventors: David Bernard Martin Lemay, Moissy-Cramayel (FR); Jean-Philippe Jacques Marin, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 210 days.

(21) Appl. No.: 18/246,984

(22) PCT Filed: Nov. 8, 2021

(86) PCT No.: PCT/EP2021/080910
§ 371 (c)(1),
(2) Date: Mar. 28, 2023

(87) PCT Pub. No.: WO2022/101129
PCT Pub. Date: May 19, 2022

(65) Prior Publication Data
US 2023/0399122 A1 Dec. 14, 2023

(30) Foreign Application Priority Data

Nov. 10, 2020 (FR) ...................................... 2011522

(51) Int. Cl.
*B64D 35/024* (2025.01)
*B64D 27/33* (2024.01)
(Continued)

(52) U.S. Cl.
CPC ........... *B64D 35/024* (2024.01); *B64D 27/33* (2024.01); *B64D 27/357* (2024.01); *B64D 31/18* (2024.01); *B64D 43/00* (2013.01); *B64D 27/026* (2024.01)

(58) Field of Classification Search
CPC .... B64D 27/33; B64D 35/024; B64D 27/357; B64D 31/18; B64D 43/00; B64D 27/026; F05D 2260/821
See application file for complete search history.

(56) References Cited

U.S. PATENT DOCUMENTS

| | | | |
|---|---|---|---|
| 6,411,869 B2 | 6/2002 | Permanne | |
| 2012/0226424 A1* | 9/2012 | Adams | ................ G01M 15/102 701/123 |

(Continued)

FOREIGN PATENT DOCUMENTS

| | | |
|---|---|---|
| EP | 3095695 A1 | 11/2016 |
| EP | 3647192 A1 | 5/2020 |

OTHER PUBLICATIONS

International Search Report, International Application No. PCT/EP2021/080910 dated Jan. 20, 2022, 4 pages.

*Primary Examiner* — Phutthiwat Wongwian
*Assistant Examiner* — Roberto Toshiharu Igue
(74) *Attorney, Agent, or Firm* — RANKIN, HILL & CLARK LLP

(57) ABSTRACT

A method for determining at least one minimum power margin of a hybrid drive train for a transport vehicle, each drive element being associated with at least one power source and at least one power consumer. The method including a step of acquiring measurements of power parameters, a step of comparing each measurement with at least one limitation threshold, so as to deduce therefrom at least one gross margin, a step of converting the gross margins into refined margins expressed according to the same common (Continued)

magnitude, a step of transposing into standardised margins at least at one reference point, a step of determining a source power margin and a consumer power margin at said reference point and a step of determining the minimum power margin by selecting the lowest power margin.

10 Claims, 6 Drawing Sheets

(51) Int. Cl.
|  |  |
|---|---|
| *B64D 27/357* | (2024.01) |
| *B64D 31/18* | (2024.01) |
| *B64D 43/00* | (2006.01) |
| *B64D 27/02* | (2006.01) |

(56) References Cited

U.S. PATENT DOCUMENTS

| 2014/0346283 | A1* | 11/2014 | Salyer | B64C 37/00 |
|---|---|---|---|---|
|  |  |  |  | 903/903 |
| 2016/0375994 | A1 | 12/2016 | Rossotto |  |
| 2017/0015434 | A1* | 1/2017 | Mckay | G05D 1/0055 |
| 2018/0251228 | A1* | 9/2018 | Sands | B64D 35/04 |
| 2020/0094952 | A1* | 3/2020 | Cerqueira | B64C 27/82 |

* cited by examiner

- MTAG_PMD = +22,8 Nm
- MTAG_PMC = -30,5 Nm
- MldcBATA_2min = +158 Nm
- MldcBATA_PMC = +140 Nm
- MldcBATB_2min = +158 Nm
- MldcBATB_PMC = +140 Nm

ET5

- MIndCA_PMD = +151.4 Nm
- MIndCA_PMC = +125 Nm
- MIndCA_2min = +169.4 Nm

H1

ET6

- MH1_PMD = +97 Nm
- MH1_PMC = +97 Nm
- MH1_2min = +122 Nm

- MM1A_2min = +61 Nm
- MM1A_PMC = +48,5 Nm
- MM1B_2min = +61 Nm
- MM1B_PMC = +48,5 Nm

O_PIL (BP)

EP1 ← Mind

Mind > BP        MINd < BP

OK              POK

METHOD FOR DETERMINING AT LEAST ONE POWER LIMIT OF A HYBRID DRIVE TRAIN FOR A TRANSPORT VEHICLE, IN PARTICULAR AN AIRCRAFT

TECHNICAL FIELD

The present invention relates to the field of hybrid drive of a transport vehicle, in particular an aircraft. In a known manner, it has been proposed to equip an aircraft with a hybrid drive train comprising several different power sources to drive a plurality of drive elements, in particular, at least one turbomachine and at least one electric battery. Such a hybrid drive train enables an aircraft to transport goods and merchandise in an optimal way while limiting noise pollution and fuel consumption while improving safety.

As an example, in reference to FIG. 1, an aircraft 1 comprising a hybrid drive train 2 comprising four drive elements H1-H4 is generally represented, in particular propellers. Each drive element H1-H4 is connected to two electric motors to allow the driving thereof: a primary motor M1A-M4A and a secondary motor M1B-M4B. As shown in FIG. 1, the primary motors M1A-M4A are electrically connected to a primary battery BATA via a primary channel CA while the secondary motors M1B-M4B are electrically connected to a secondary battery BATB via a secondary channel CB. The hybrid drive train 2 comprises a turbogenerator TG, comprising a gas turbomachine, to electrically supply the electric motors M1A-M4A, M1B-M4B and the batteries BAT, BATB via the channels CA, CB. In this example, the drive is referred to as a series hybrid.

In a known manner, a hybrid drive train 2 may adopt different architectures, in particular:

- a series architecture wherein the gas turbomachine only produces electrical power (turbogenerator) to supply the channels and recharge the batteries.
- a parallel architecture wherein the gas turbomachine produces only mechanical power to drive drive elements. The electrical power is provided by batteries that may be recharged by the electric machines that are then used both as a motor and as a generator.
- a series and parallel architecture wherein the power produced by the gas turbomachine is used both in mechanical form to drive drive elements and in electrical form to power electric motors or recharge batteries. This architecture incorporates features of series hybridization and parallel hybridization.

Each hybrid drive train has power limitations that depend on many parameters, in particular, its architecture, the maximum torque on the gas turbomachine, the maximum alternating current of the turbogenerator, the maximum current supplied to a channel during electrical generation, the maximum electric current that the battery may deliver, the maximum electric current at which a drive motor may operate, etc. In other words, it is difficult to determine a power limit for the hybrid drive train.

In addition, a hybrid drive train 2 is also designed to operate in several configurations to compensate for the failures of certain energy sources. As an example, the hybrid drive train may be operated according to:

- a nominal configuration with all available sources, capable of supplying part of the power demand.
- a configuration on batteries BATA, BATB only in case of failure of the turbogenerator TG.
- a configuration on turbogenerator TG in case of failure of a battery BATA, BATB.

On any aircraft, the supply of the power required by the pilot (human or automatic) is highly critical for flight safety since it is what provides the levitation of the aircraft. This critical nature is further accentuated on a VTOL type aircraft (vertical take-off/landing aircraft) because the power developed by each drive element contributes not only to the levitation, but also to the control of the attitude of the aircraft and therefore directly to the stability of the flight.

Compliance with these power demands may, in certain cases, come into conflict with certain performance limits of the drive train. When this situation occurs, the drive train may no longer satisfy the demand and may either protect itself by continuing to provide a service but limiting the power delivered, or follow the power demand until triggering a protection device which potentially leads to a partial or total power cut-off.

Whatever the behavior of the drive train, the pilot may be "surprised" by the refusal (or loss) to deliver the power demand. This may be detrimental if the latter is carrying out a "complex" or critical maneuver. Indeed, the latter may hardly compensate for the lack of power, which would have the consequence of affecting flight safety.

To eliminate this disadvantage, an immediate solution consists in oversizing the power capacity of the drive train in order to have a large safety margin in all conditions of use and all configurations. Such a solution cannot be retained because it impacts the mass of the drive train and therefore reduces the mass embarkable by the aircraft.

One of the objectives of the present invention is to enable the pilot (human or automatic) to permanently determine the available power margin of the hybrid drive train in order to be able to determine the control commands that may be carried out while ensuring the flight safety of the aircraft.

Known in the prior art by patent rights U.S. Pat. No. 6,411,869B2, EP364792A1 and EP3095695A1 several methods for determining a power margin.

SUMMARY

The invention relates to a method for determining at least one minimum power margin of a hybrid drive train for transport vehicles, in particular an aircraft, the drive train comprising a plurality of power sources, a plurality of power consumers and a plurality of drive elements, each drive element being associated with at least one power source and at least one power consumer, the method comprising:

- a step of acquiring measurements of a plurality of power parameters of the hybrid drive train, at least two measurements being expressed according to different units of measure,
- a step of comparing each measurement to at least one limitation threshold, determined respectively for each power parameter from a threshold database, so as to deduce therefrom at least one gross power margin for said power parameter,
- a step of converting, from a transformation database, the gross power margins of said power parameters into refined power margins expressed according to the same common unit of measure.
- a step of transposing, from a yield database, refined power margins into standardized power margins at least at one reference point, the yield database determining the yields of interfaces between an acquisition point and a reference point,
- a step of determining a source power margin, from the standardized power margins of the sources at said reference point, and a consumer power margin, from the standardized power margins of the consumers at said reference point.

a step of determining the minimum power margin by selecting the lowest power margin between the consumer power margin and the source power margin at said reference point.

In the absence of "visibility" on the available power margins, a control system (human or automatic) may be required to engage overstressing maneuvers for a part of the drive train elements. Thanks to the invention, knowledge of the available margins at all times allows the control system to plan feasible maneuvers while remaining in the available power range.

By hybrid, it is understood that the drive train comprises a plurality of power sources of different types, for example, at least one thermal source (a thermal turbomachine or other) and at least one electrical source (an electric battery, a hydrogen fuel cell or other).

Reference point means a physical point in the drive train.

The power consumers are configured to consume power and are, for example, motors, especially electric motors. The power consumers are configured to supply the drive elements, in particular, pulleys driven in rotation. The power consumers are, for example, electric motors to drive the drive elements.

As mentioned above, the calculation of instantaneous power margins is particularly complex for a hybrid drive train with numerous and heterogeneous physical unit of measure (mechanical torque and speed, alternating currents, direct current and voltage, etc.) and various technologies the limitations of which depend on independent factors (atmospheric pressure and temperature for combustion engines, charge level and temperature for batteries, voltage level for electrical equipment). Thanks to the steps according to the invention, the different power parameters are methodically treated in order to evaluate them at the same reference point in order to obtain a relevant minimum power margin.

Preferably, the source power margin is obtained by a weighted sum of the standardized power margins of the sources at said reference point. Preferably, weighting factors make it possible to take into account the overall architecture (power source distributions and distribution of the latter to consumers).

Preferably, the consumer power margin is obtained by a weighted sum of the standardized power margins of the consumers at said reference point. Preferably, weighting factors make it possible to take into account the overall architecture (power source distributions and distribution of the latter to consumers).

Preferably, the reference point(s) correspond to one or more drive elements. This is particularly relevant for a control system that wants to know the power available at the level of the drive elements (the useful power to move the aircraft). It is therefore necessary to take into account the energy yields of the various transmission members. These yields may also vary according to the operating conditions of the system (e.g. according to the power level, temperature of electrical equipment, etc.).

Preferably, when a power source supplies several power consumers in parallel, it is assumed that the total power received in a node is distributed equally among the power consumers.

Alternatively, when a power source supplies several power consumers in parallel, the total power received in one node is distributed weighted among the power consumers, preferably according to the nominal power of each consumer. Such a distribution is relevant when consumers have very different nominal powers.

Preferably, for an aircraft, the individual power margins are grouped according to the main axes of the aircraft in order to indicate margins in roll, pitch, yaw.

According to a preferred aspect, the drive train comprises at least one turbogenerator and at least one electric battery as power sources.

According to a preferred aspect, the drive train has a plurality of electric motors as power consumers.

The invention also relates to a method for controlling a transport vehicle, in particular an aircraft, comprising a hybrid drive train, by means of a control system, the method comprising:

a step of determining a control order of the transport vehicle, in particular the aircraft, by the control system, the control order being associated with a power requirement, a step of determining at least one minimum power margin of the drive train by a method as presented previously, and a step of validating the control order if the power requirement is below the minimum power margin.

Thanks to the control method, the control orders are validated dynamically before being implemented, which avoids overtaxing the drive train.

The invention also relates to a hybrid drive train for a transport vehicle, in particular an aircraft, the drive train comprising a plurality of power sources, a plurality of power consumers and a plurality of drive elements, each drive element being associated with at least one power source and at least one power consumer, the drive train comprising at least one calculator configured to:

acquire measurements of a plurality of power parameters of the hybrid drive train, at least two measurements being expressed according to different units of measure, compare each measurement with at least one limitation threshold, determined respectively for each power parameter from a threshold database, so as to deduce at least one gross power margin for said power parameter, convert, from a transformation database, gross power margins of said power parameters into refined power margins expressed according to the same common unit of measure.

transpose, from a yield database, refined power margins into standardized power margins in at least one reference point, the yield database determining the yields of the transmission members between an acquisition point and a reference point, determine a source power margin, from standardized power margins of the sources at said reference point, and a consumer power margin, from the standardized power margins of the consumers at said reference point.

determine the minimum power margin by selecting the lowest power margin between the consumer power margin and the source power margin at said reference point.

The transformation database and the yield database may be accessed by the calculator, preferably stored in the calculator.

The invention also relates to a transport vehicle, in particular an aircraft, comprising at least one hybrid drive train as presented previously.

DESCRIPTION OF THE DRAWINGS

The invention will be better understood upon reading the following description, given as an example, and by referring to the following figures, given as non-limiting examples, wherein identical references are given to similar objects.

It should be noted that the figures set out the invention in detail in order to implement the invention, said figures may of course be used to better define the invention if necessary.

DETAILED DESCRIPTION

The invention relates to a method for determining a power limit of a hybrid drive train for a transport vehicle, in particular an aircraft. Preferably, in reference to FIG. 1, the hybrid drive train 2, hereinafter referred to as "drive train 2", contains a plurality of different types of power sources (hybrid system). Preferably, the invention is applied for a drive train 2 that is distributed, i.e., which comprises a plurality of power consumers (distributed system).

As previously presented, a hybrid drive train may have various architectures. As an example, in reference to FIG. 1, a hybrid drive train 2 of the series-hybrid type, comprising four drive elements H1-H4, in particular propellers, was presented. Each drive element H1-H4 is associated with at least one power source and at least one power consumer.

In this example, each H1-H4 drive element is connected to two electric motors to allow for the driving thereof: a primary motor M1A-M4A and a secondary motor M1B-M4B. The primary motors M1A-M4A are electrically connected to a primary battery BATA via a primary channel CA while the secondary motors M1B-M4B are electrically connected to a secondary battery BATB via a secondary channel CB. The drive train 2 comprises a turbogenerator TG to electrically supply the electric motors M1A-M4A, M1B-M4B and the batteries BAT, BATB via the CA, CB channels. A turbogenerator TG as well as electric batteries were presented, but the invention applies to any power source, in particular, a fuel cell or an electrical energy store (super capacitor, electrochemical battery, etc.).

Figure 1:
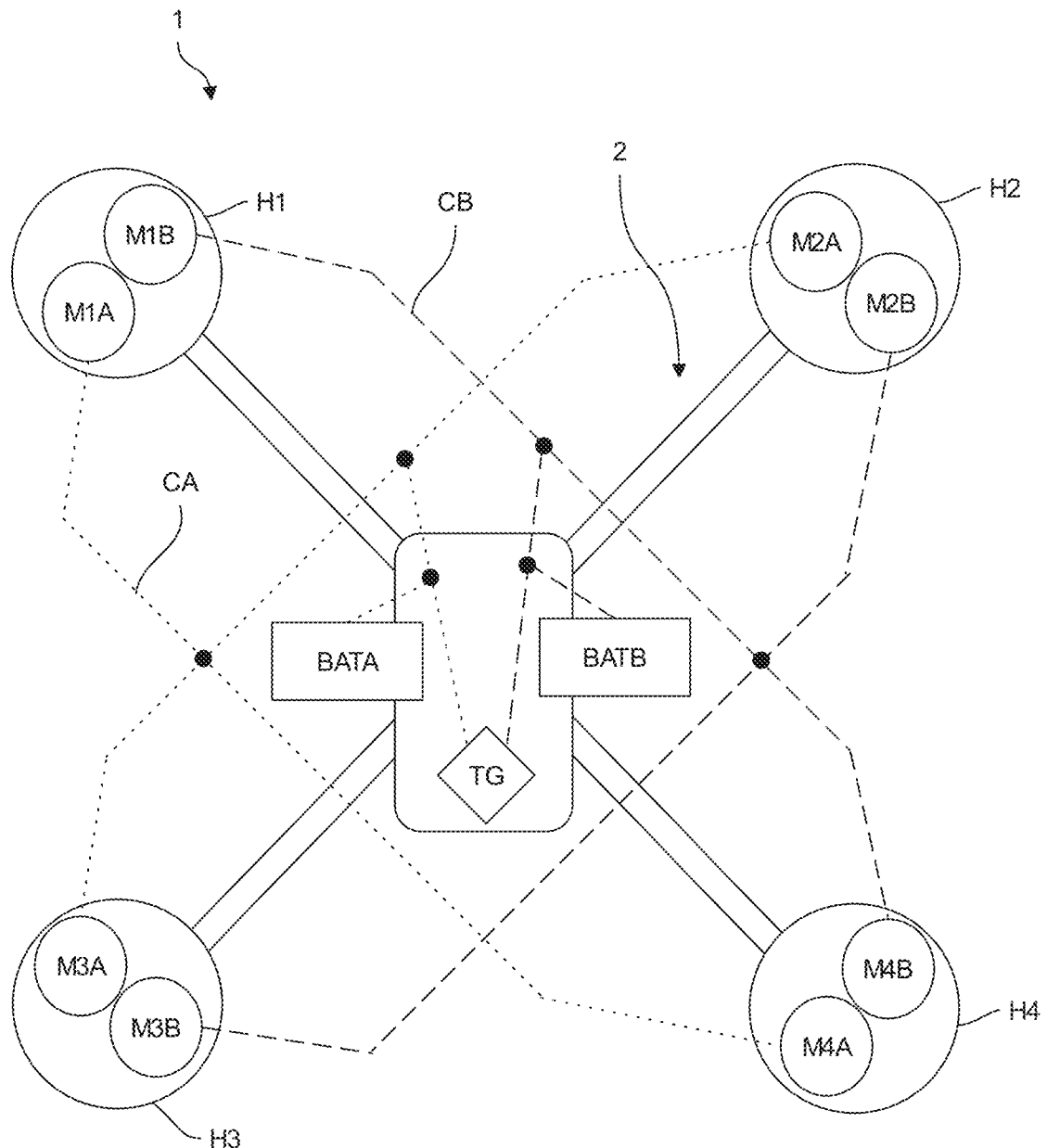
FIG. 1 is a schematic representation of the top of a drive train of an aircraft.
Figure 2:
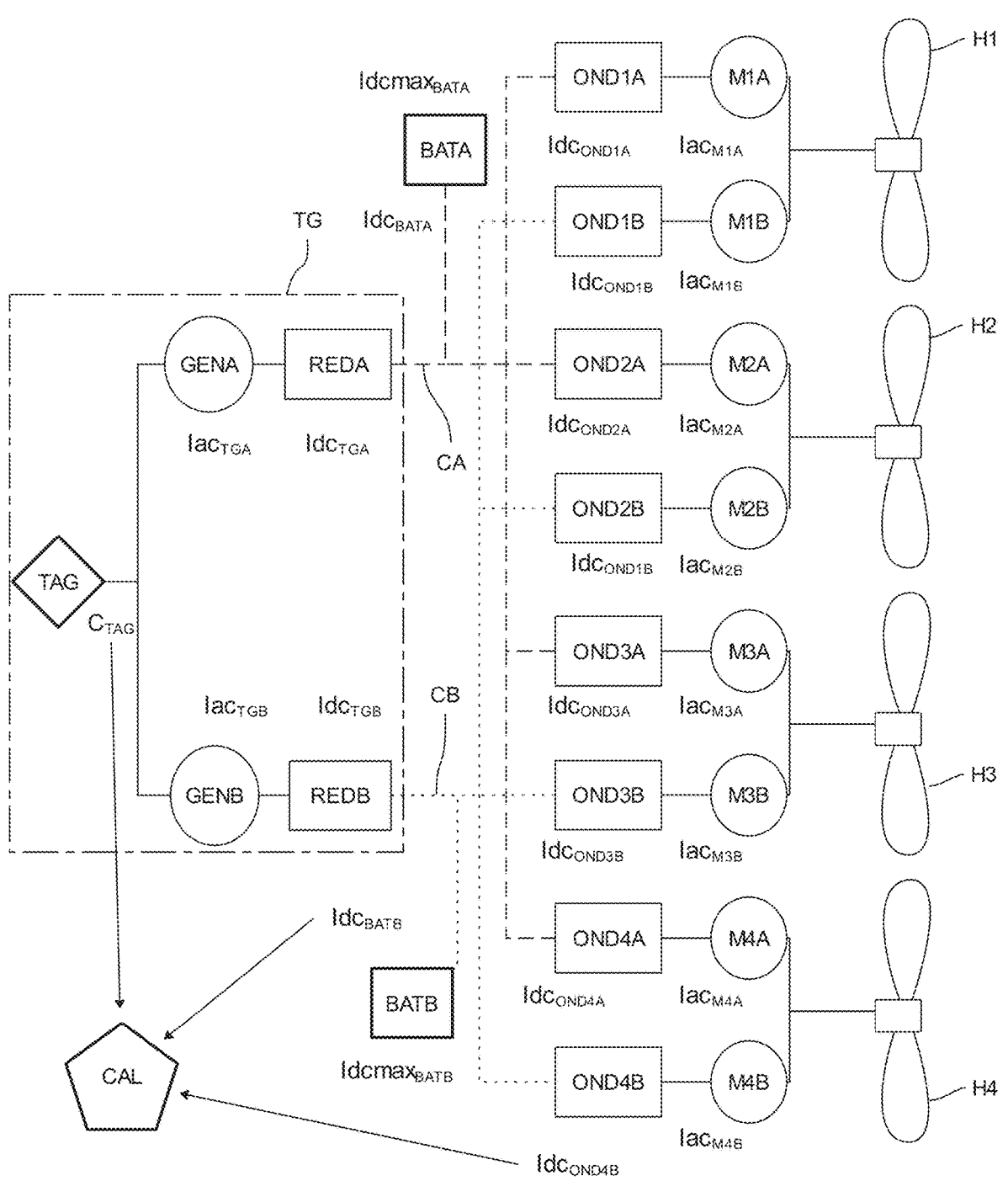
FIG. 2 is a detailed representation of a drive train of an aircraft.

In reference to FIG. 2, the drive train 2 of FIG. 1 is shown in more detail. The turbogenerator TG comprises a gas turbine TAG driving two electric generators GENA, GENB (a primary generator GENA and a secondary generator GENB). In this example, the turbomachine TAG comprises a low-pressure shaft and a high-pressure shaft known to those skilled in the art. In a known manner, in this example, the turbogenerator TG produces continuous electrical power from fuel combustion. Each electric generator GENA, GENB transforms this mechanical power into alternating voltage and current $Iac_{TGA}$, $Iac_{TGB}$. The turbogenerator TG also comprises two rectifiers REDA, REDB to provide the primary channel CA and the secondary channel GB with direct electric voltages and currents $Idc_{TGA}$, $Idc_{TGB}$.

The channels CA, CB are also supplied by the two batteries BATA, BATB, each supplying direct current $Idc_{BATA}$, $Idc_{BATB}$. Preferably, each battery BATA, BATB is equipped with a control and monitoring system (BMS) that determines the maximum current $Idcmax_{BATA}$, $Idcmax_{BATB}$ (FIG. 2) that it may deliver at any time. This maximum current therefore varies over time and according to the operating conditions. The two channels CA, GB are independent and each comprise a node combining the electrical currents from the battery BATA, BATB and the turbogenerator TG to distribute the electrical power to at least two electric motors each, in this example, eight electric motors M1A-M4A, M1B-M4B.

Still in reference to FIG. 2, the primary channel CA supplies four electric motors M1A-M4A through four inverters ONDIA-OND4A transforming direct electrical power into alternating voltages and currents $Iac_{M1A}$-$Iac_{M4A}$. Similarly, the secondary channel GB supplies four electric motors M1B-M4B through four inverters OND1B-OND4B which transform direct electrical power into alternating voltages and currents $Iac_{M1B}$-$Iac_{M4B}$. Each drive element H1-H4 is thus driven by two electric motors M1A/M1B-M4A/M4B rotating at a speed proportional to that of the drive element H1-H4, and each providing a mechanical torque. The drive torque of each drive element H1-H4 is the sum of the torques supplied by each of the two coupled motors M1A/M1B-M4A/M4B.

In reference to FIG. 2, the drive train 2 comprises a motor calculator GAL controlling the members of the drive train 2 and acquiring power parameters of said members in order to calculate power margins. The motor calculator CAL is connected to one or more aircraft calculators to enable communication with the control system of the aircraft.

In a known manner, a drive train 2 comprises a plurality of power parameters PARi which are identified for said drive train 2. The power parameters PARi are for example:

The rotational speed $N1_{TAG}$ of the high pressure shaft of the gas turbine TAG. This measurement, combined with measurements of atmospheric pressure P0atm and temperature T1atm, makes it possible to acquire an image of the aerodynamic power generated by the gas turbine TAG.

The gas temperature $T4_{TAG}$ of the gas turbine TAG.

The torque $C_{TAG}$ driving the electric generators GENA, GENB as well as the rotation speed of the low-pressure drive shaft $N2_{TAG}$. From these 2 measurements, an image is obtained of the mechanical power produced by the gas turbine TAG.

The alternating electrical currents $Iac_{TGA}$, $Iac_{TGB}$ of the two generators GENA, GENB.

The direct electric currents $Idc_{TGA}$, $Idc_{TGB}$ at output of electric rectifiers REDA, REDB.

The direct voltage measured at the reference point of the two channels CA, CB.

The direct electrical currents $Idc_{BATA}$, $Idc_{BATB}$ from the batteries BATA, BATE. By convention, positive current is considered when delivered by the battery and negative when it recharges it.

The alternating electric currents $Iac_{M1A}$-$Iac_{M4A}$/$Iac_{M1B}$-$Iac_{M4B}$ of all electric motors M1A-M4A, M1B-M4B, The temperature of each electric motor M1A-M4A, M1B-M4B.

The rotation speed of each drive element H1-H4.

Figure 3:
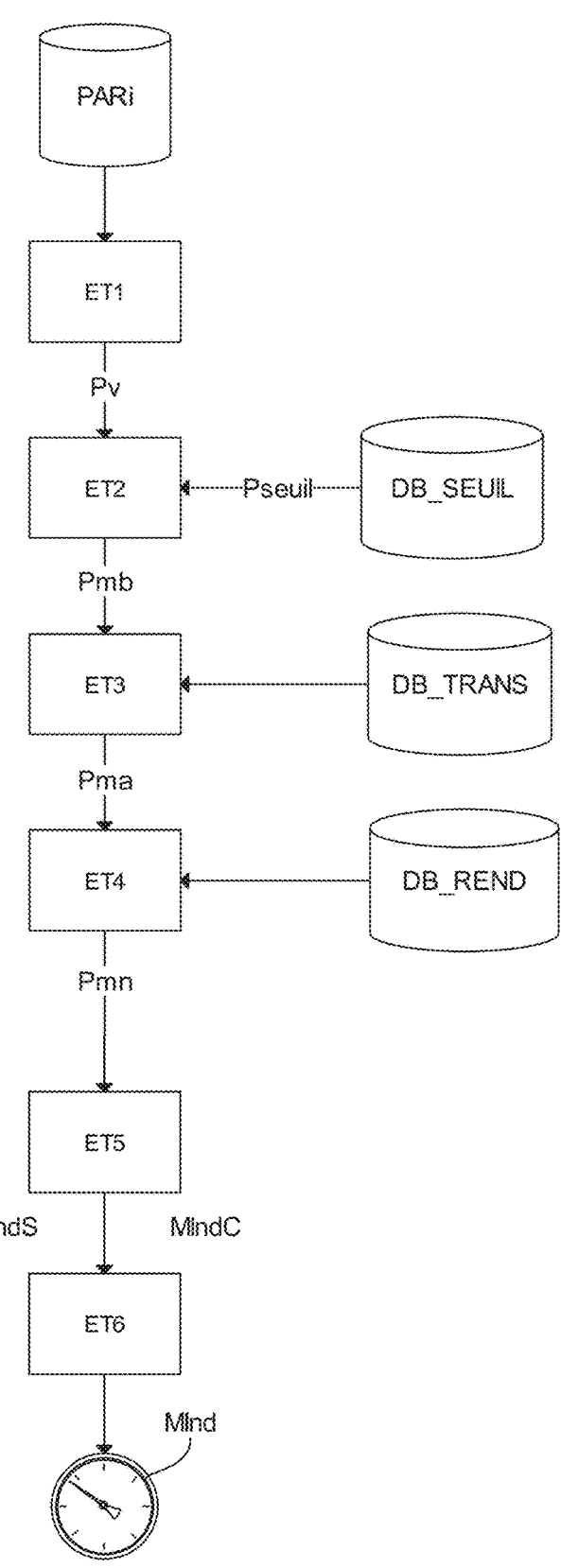
FIG. 3 is a schematic representation of the steps of the method for determining a power limit of a hybrid drive train for aircraft.

In reference to FIG. 3, the method comprises a step of acquiring ET1 of measurements Pv of a plurality of power parameters PARi of the drive train 2. Preferably, several measurements Pv are expressed according to different units of measure. The acquisition step ET1 is carried out in a known manner from sensors of different types that are connected to the motor calculator CAL.

As an example the measurements Pv are in particular:

THE TORQUE $C_{TAG}$ of the gas turbine TAG at its current operating point, the torque $C_{TAG}$ being expressed in Newton meters.

the alternating electrical currents $Iac_{TGA}$, $Iac_{TGB}$ of the two generators GENA, GENB, the currents being expressed in amperes.

the temperature of each electric motor M1A-M4A, M1B-M4B, the temperature is expressed in degrees.

The method comprises a step of comparing ET2 each measurement Pv at a power threshold Pseud, determined respectively for each power parameter PAR, in order to deduce a gross power margin Pmb for said power parameter PAR.

In this example embodiment, each power parameter PARi is associated with a power threshold Pseuil in a threshold database DB_SEUIL. The threshold database DB_SEUIL is accessible by the motor calculator CAL, which may thus determine the gross power margin Pmb for each power parameter PAR. Preferably, the power thresholds Pseuil are independent of the operating points of the drive train. Such an independence property is advantageous for the calculated power margins to have a predictive value (and therefore independent of future aircraft maneuvers and, therefore, independent of future points of operation of the drive train).

Preferably, each power threshold Pseuil is specific to a power parameter PARi in said hybrid drive train and, preferably, specific to said operating point and the operating configuration. Also, each power parameter PARi is associated with a power threshold Pseuil for each operating point and each operating configuration in the threshold database DB_SEUIL.

Preferably, said power threshold Pseuil is expressed in the same unit of measure as the measurement Pv, which makes it possible, by simple calculation of difference, to determine the gross power margin Pmb expressed in the same unit of measure.

In this example, the following is advantageously obtained:

the gross torque margin of the gas turbine TAG compared to a maximum torque of the gas turbine TAG at its operating point, the torque margin being expressed in Newton meters, the gross current margin delivered by each electric generator GENA, GENB, the current margin being expressed in amperes and the gross temperature margin of each electric motor M1A-M4A, M1B-M4B, the temperature margin is expressed in degrees.

Calculating a global power margin of the TAG may be complex, particularly in the presence of series-parallel architectures where a significant portion of power is taken both on a free turbine and on a gas generator. The pilot then needs to know the available power margin on each of the two branches in order to be able to adjust the demand accordingly. In this case, it is proposed to calculate the grass power margin for each output of the TAG gas turbine. For example, for an architecture wherein the free turbine of the gas turbine TAG supplies mechanical power to the drive elements H1-H4 and where the electrical power is extracted from the gas generator TAG. The mechanical power margin is calculated on the iso-sampling free turbine on the gas generator (electrical iso power) and the electrical power margin (on the gas generator) with mechanical iso sampling on the free turbine.

The method comprises a step of converting ET3, from a transformation ratio database DB_TRANSF, gross power margins Pmb of said power parameters PARi into refined power margins Pma expressed according to the same common unit of measure. In other words, while the gross power margins Pmb are expressed in different units (Newton meters, amperes or degrees), the refined power margins Pma are all expressed in the same units of measure, allowing them to be processed together. The refined power margins Pma are all expressed in the same homogeneous unit of measure.

This homogeneous unit of measure is preferably expressed in Watts as it allows power to be determined for the drive elements H1-H4. It goes without saying that the homogeneous unit of measure could be different, in particular, a torque or amperes.

Advantageously, the transformation ratio database DB_TRANS is specific to the hybrid drive train 2 and determines the transformation ratios between the power parameters PARi among them. Preferably, the transformation ratios are determined theoretically by energy modeling of the hybrid drive train 2. Preferably, each transformation ratio is in the form of at least one mathematical equation which depends on the operating point and configuration of the hybrid drive train 2. Thus, the impact of a current or temperature change on a channel in terms of torque on drive elements H1-H4 may be determined. In this example, the transformation ratio database DB_TRANS is stored in tables in the motor calculator CAL.

In this example, the gross current margin delivered by each electric generator GENA, GENB and the gross temperature margin of each electric motor M1A-M4A, M1B-M4B are respectively transformed into refined power margins Pma, which are expressed in watts.

The method comprises a step of transposing ET4, from a yield ratio database DB_REND, refined power margins Pma, hereinafter referred to as "refined margins Pma", for each power parameter PARI into standardized power margins Pmn at one or more reference points of the drive train 2, hereinafter referred to as "standardized margins Pmn". Preferably, the yield ratios DB_REND are independent of the operating points of the drive train.

In this example, the reference points are chosen so as to be as close as possible to where the power is actually useful for controlling the aircraft, i.e. as close as possible to the drive elements H1-H4. A preferred reference point is, for example, the mechanical power available on the drive elements H1-H4. Of course, however, the reference points could be chosen differently according to the needs or specificity of the drive train 2.

Advantageously, the yield database DB_REND is specific to the drive train 2 and determines the yield ratios between the power parameters among them, in particular according to the transmission members between an acquisition point and a reference point. Preferably, the yield ratios are determined theoretically by energy modeling of the hybrid drive train 2. Preferably, each yield ratio is in the form of at least one mathematical equation which depends on the operating point and configuration of the hybrid drive train 2. Thus, a refined margin Pma obtained at a given point in the hybrid drive train 2 may be transposed into the same reference point in order to determine the actual margin for said reference point. In this example, the yield database DB_REND is stored in the motor calculator CAL in the form of table(s) which may depend on other parameters measured, for example, the average current level and the voltage of the channels.

By way of example, the following transpositions may be carried out. The refined torque margin Pma of the gas turbine TAG, expressed initially on the drive shaft of electric generators GENA, GENB, is transposed onto the drive shafts of the drive elements H1-H4 (reference point) from:

the transformation yield ratios of the generators GENA, GENB and of their rectifiers REDA, REDB, which in this example are 90%, yield ratios of the transport of electrical power in the channels CANA, CANB, which in this example are 95%, the yield ratio of the electric motors M1A-M4A, M1B-M4B and their inverter OND1A-OND4A, OND1B-OND4B, which in this example is 93%.

Thus, a refined margin Pma of torque of the gas turbine TAG is transposed with a yield factor of 80% (90%*95%*93%) on the drive shafts of the drive elements H1-H4 to determine the standardized margin Pmn.

Similarly, the refined power margin Pma of battery BATA, BATE, expressed initially at their electrical connection terminal strip, is transposed onto the drive shafts of the drive elements H1-H4 (reference point) from:

yield ratios of the transport of electrical power transmission in the channels CA, CB, which in this example are 95%, and the yield ratio of the electric motors M1A-M4A, M1B-M4B and their inverter OND1A-OND4A, OND1B-OND4B which, in this example, is 93%.

Thus, a refined power margin Pma of the battery BATA-BATE is transposed with a yield factor of 88% (95%*93%) on the drive shafts of the drive elements H1-H4 to determine the standardized margin Pmn. Thus, the further away the reference point is from the measurement location, the greater the number of yields to be considered.

Also, for a same refined power margin value Pma, expressed in watts, of 50 kW of torque of the gas turbine and 50 kW of battery power, the standardized value Pmn is different on the drive shafts of the drive elements H1-H4 (i.e. at the reference point) (standardized gas turbine margin: 50*0.80=40 kW: battery standardized margin: 50*0.85=42.5 kW).

Still in reference to FIG. 3. the method comprises a step of determining ET5 a source power margin for each reference point and a consumer power margin for each reference point. Power margins for sources and consumers have been presented, but it goes without saying that power margins could also be calculated for power transfer members, for example an electric cable or a transmission shaft.

In this example, the power margins are determined for each drive element H1-H4. These are called individual margins Mind. Thus, there are as many individual margins Mind as there are reference points, in this example, there are 4.

At a given reference point (a given drive element H1-H4), the source power margin is obtained by summing the standardized margins of the sources supplying said drive element, namely, the batteries BATA, BATB and the gas turbine TAG in our example. The source power margin MIndS depends on the distribution of sources on the drive elements as well as the configuration of the hybrid drive train (availability or unavailability of sources). When power sources supply only part of the drive elements H1-H4, the one with the lowest standardized margin is selected.

In other words, for each reference point H1-H4, it is sufficient to trace the power train back to the primary sources (batteries, turbogenerator, etc.) taking into account the possible limitations (margins) of each power transfer member encountered on the route.

If a source supplies several consumers in parallel, it is assumed that the total power is distributed equally between each consumer in parallel. This equidistribution hypothesis is advantageously verified by the fact that the topology of the aircraft and its drive system are symmetrical around a center of gravity. Nevertheless, it goes without saying that a weighted distribution hypothesis could be implemented when consumers have very different nominal powers.

Similarly, in a given reference point, the individual power margin of the consumer MIndC is obtained by summing the standardized margins of the consumers taking power at the reference point, namely, the motors M1A-M4A, M1B-M4B. To determine the individual power margin Mind, a step of selecting ET6 the individual margin of minimum power is performed between the individual consumer power margin MIndC and the individual source power margin MIndS. In this example, as will be detailed later, the individual consumer power margin MIndC is limiting.

Selecting the individual margins Mind is performed by tracing the power train supplying a given power element, by selecting the margins of the element offering the least power.

When a source supplies several consumers, it is important to take into account this distribution as well as the individual power of each consumer according to the modes. For example, one source may deliver 100 kW and supply two motors, each of which may supply 60 kW. In this case, the power potentially available on each propeller is 60 kW, but the total power available is limited to 100 kW in total of the 2 propellers, as limited by the source. Thus, according to the preferred solution of the invention, the individual margin of each propeller would be 50 kW.

For example, to determine the individual power margin Mind:

the standardized minimum torque margin is selected from that from the gas turbine TAG and those from each of the generators GENA, GENB, and the global drive torque margin is indicated.

the standardized minimum torque margin among the different limiting factors of a motor M1A-M4A, M1B-M4B, such as the temperature limit, the inverter current limit, or the current limit of the electrical power supply dedicated to the motor M1A-M4A, M1B-M4B.

An individual power margin Mind for each drive element H1-H4 informs the pilot of the drive power available to act on the aircraft's attitude, thus contributing to flight stabilization (e.g.: the power margin on each motor on the right-hand side provides information on the aircraft's ability to roll to the left). Advantageously, in the case of equal distribution, the pilot only needs to respect all the individual power margins to validate a control law.

Alternatively, when the drive elements have very different nominal powers, the total power received at a node is distributed weighted between the drive elements.

Several types of indication are possible according to the preferences of the control system. In the previous example, a individual margin Mind per drive element H1-H4 was chosen. These indications have the advantage of offering the control system very good visibility on the "controllability" of the aircraft.

The individual power margins Mind may also be grouped by main axis of the aircraft and thus indicate margins in roll, pitch, yaw. This solution provides more synthetic and "formatted" indications in a well-known reference system of the control system.

Figure 4:
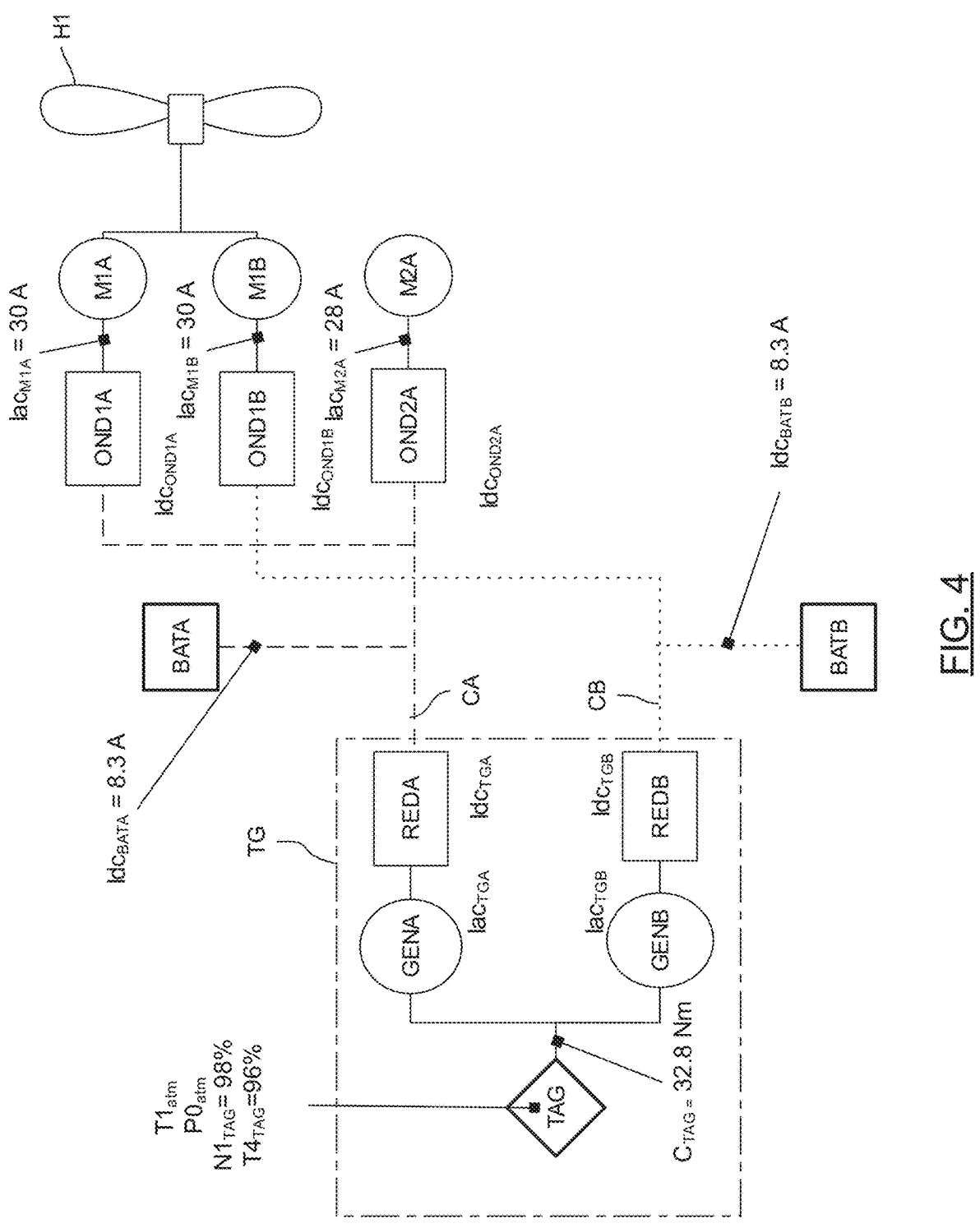
FIG. 4 is a schematic representation of an example of an acquisition step.

An example of detailed implementation will be presented in reference to FIG. 4.

In this example, in reference to FIG. 4, an acquisition step ET1 of measurements Pv of a plurality of power parameters PARi of the hybrid drive train 2 was carried out, in particular, at the level of the gas turbine TAG, the batteries BATA, BATB and the motors M1A-M4A, M1B-M4B.

A step of comparing ET2 each measurement with several limiting thresholds, i.e. at proven limits, is then performed. Preferably, the limitation thresholds correspond to times during which the power parameter PARi may be maintained. This is in particular the case for the parameters of the gas turbine TAG for which at least two operating regimes are conventionally distinguished:

a regime threshold PMD, for maximum take-off power, which may be maintained for a limited time, usually between 10 mn and 30 mn a regime threshold PMC, for continuous maximum power, which may be maintained indefinitely.

It goes without saying that other thresholds could be provided for, for example, emergency regimes enabling higher power levels to be reached, but the duration of which may be limited. Similarly, some electrical power equipment may also have several current limits that may be maintained for varying lengths of time. The margin separating each parameter at its certified limit(s) is thus calculated. By way of example, in reference to FIG. 5, the following margins are thus calculated:

Under the atmospheric conditions P0atm, T1atm measured at the time, the limits of the speed N1TAG of the TAG gas turbine corresponding to the PMD (duration 10 mn) and PMC regimes are 100% and 95% respectively, For a measurement of 98%, the gross margins in N1TAG for each regime are therefore: $MN1\_PMD=+2\%$, $MN1\_PMC=-3\%$.

Similarly, for the T4TAG turbine drive temperature, the PMD and PMC regime limits are 100% and 94% respectively. For a measurement of 96%, the gross temperature margins T4TAG are therefore: $MT4\_PMD=+4\%$ and $MT4\_PMC=-2\%$.

The torque limit $C_{TAG}$ generated by the gas turbine TAG is unique and is 40 Nm. For a measurement of 32.8 Nm, the gross torque margin is therefore $MCT=+7.2$ Nm.

The current limit of the battery BATA is 160 A continuously and 180 A for 2 min. Two current margins for the battery BATA are therefore also calculated: the gross margin limited to 2 mn $MIdcBATA\_2$ mn=+172 A. and the continuous gross margin $MIdcBATA\_PMC-152$ A. The same applies to the secondary battery BATB.

The alternating current limit of the electric motors M1A-M4A, M1B-M4B is 49 A permanent and 54 A for 2 min. Two current gross margins are calculated for each motor:

Motor 1A: for a current measurement IacM1A of 30 A, the gross margin limited to 2 mn $MM1A\_2$ mn-+24 A and the continuous gross margin MM1A PMC-+19 A.

Motor 1B: for a current measurement IacM1B of 30 A, the gross margin limited to 2 mn $MM1B\_2$ mn=+24 A and the continuous gross margin $MM1B\_PMC=+19$ A.

Motor 2A: for a current measurement IacM2A of 28 A, the gross margin limited to 2 mn $MM2A\_2$ mn=+26 A and the continuous gross margin $MM2A\_PMC=+21$ A.

The same action is taken for the other equipment in the system until the margins of all the parameters are obtained A step of converting ET3 and a step of transposing ET4 each of the margins calculated in the previous step are then carried out into a homogeneous unit of measure located at one or more reference points, preferably, at the output of the hybrid drive system. In this example, the reference point is the first drive element H1.

For the limits of the gas turbine TAG, at the current operating point, the model of the latter allows converting the margins of $N1_{TAG}$ and $T4_{TAG}$ into margins of equivalent power at turbine output. Using this model, the calculator CAL determines the following conversions:

$MN1\_PMD=+15.7$ kW and $MN1\_PMC=-20.9$ kW

MT4 PMD=+17.8 kW and MT4 PMC=−18.3 kW

MCT=+18.8 kW (PMD and PMC)

Figure 5:
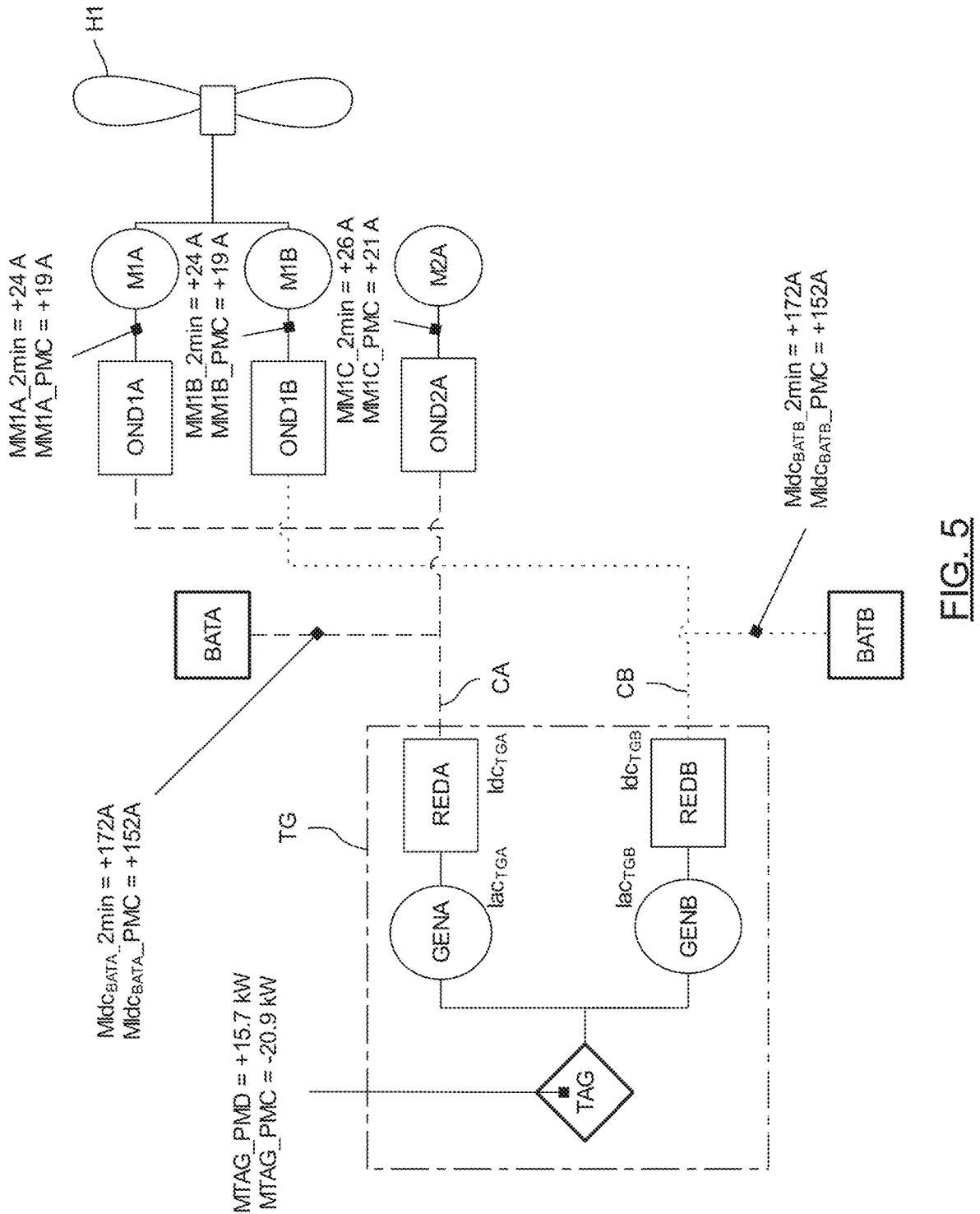
FIG. 5 is a schematic representation of a step of determining gross margins.

After these conversions, the method selects the minimum torque margin of the gas turbine TAG. In this example, the overall minimum torque margins are: $MTAG\_PMD=+15.7$ kW, $MTAG\_PMC=-20.9$ kW (limited by N1TAG in this example) (FIG. 5).

The method then transposes this overall margin of the gas turbine TAG to the drive elements H1-H4 by following the power train and applying the successive yields of each transmission member.

Figure 6:
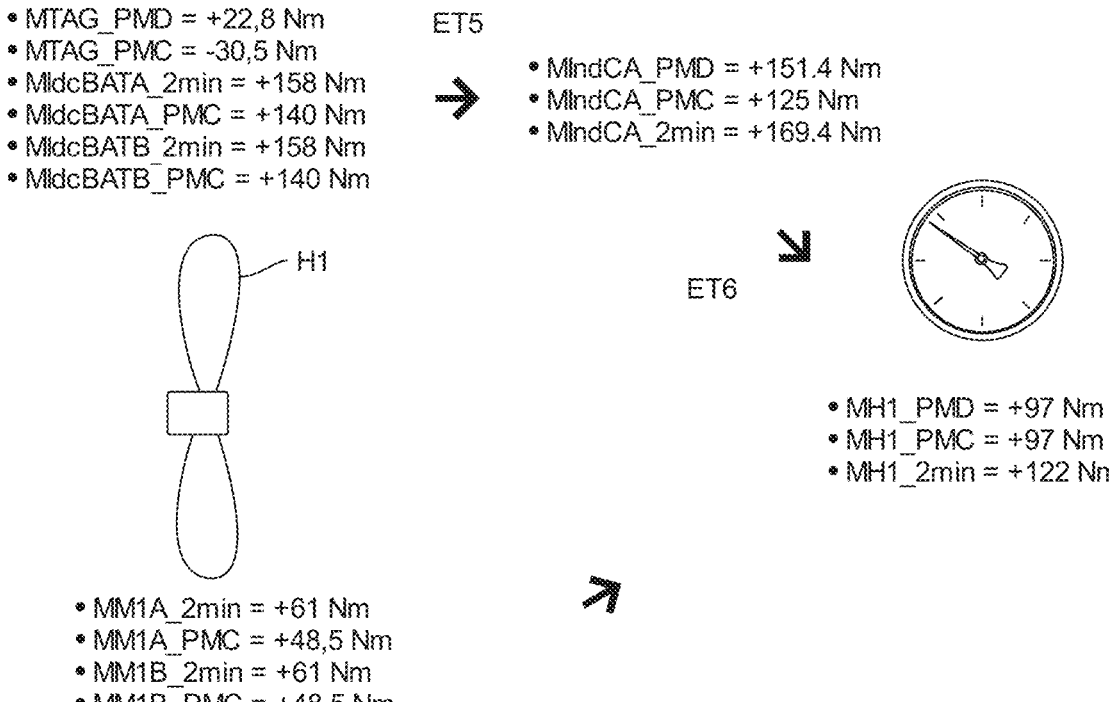
FIG. 6 is a schematic representation of determining a power margin from standardized power margins expressed for a first drive element and FIG. 7 is a schematic representation of a control method using the individual power margin.

In reference to FIG. 6, applied to our example at the reference point of the first drive element H1, according to an iso-distribution hypothesis at the connection node of the motors M1A, M2A, the minimum margins MTAG_PMD, MTAG_PMC of the gas turbine TAG then become:

MTAG_PMD=+11.4 Nm

MTAG_PMC=−15 Nm

For the margins of the primary battery BATA, the direct current margin is first converted into electrical power available at the battery output using the voltage measurement Vdc of the primary channel CANA it supplies. The margins expressed in terms of power are therefore:

the margin limited to 2 mn $MIdcBATA\_2$ mn−+103 kW and the continuous margin $MIdcBATA\_PMC=91.2$ kW The transposition of these margins into torque available to the drive elements H1-H4, taking into account the yields of the drive train then gives:

$MIdcBATA\_2$ mn=+158 Nm $MIdcBATA\_PMC=+140$ Nm

Motor limits M1A-M4A, M1B-M4B are also converted into torque margins available on each drive element H1-H4 using an electric motor model. In the example, this conversion gives the following results:

Motor 1A: $MM1A\_2$ mn=+61 Nm and $MM1A\_PMC=+48.5$ Nm.

Motor 1B: $MM1B\_2$ mn=+61 Nm and $MM1B\_PMC=+48.5$ Nm.

Motor 2A: $MM2A\_2$ mn=+66 Nm and $MM2A\_PMC=+53.6$ Nm.

In this example, a drive architecture in a nominal situation (without failure) is described where all power sources (batteries BATA, BATB, gas turbine TAG) supply all the drive elements H1-H4, there is therefore no need to select a more limiting power source than the others.

The individual power margin at the junction node of the battery BATA (resp. BATB) on the primary power channel CA (resp. CB), noted MindCA, therefore corresponds to the sum of the margins of the battery and of the turbogenerator, distributed evenly over the 4 motors (M1A-M4A) supplied by this primary channel. The following relationships are obtained:

MindCA_2 mn=MTAG_PMD+MIdcBATA_2 mn
MindCA_2 mn=11.4 Nm+158 Nm=+169.4 Nm
MindCA_PMD=MTAG_PMD+MIdcBATA_PMC
MindCA_PMD=11.4 Nm+140 Nm=+151.4 Nm
MindCA_PMC=MTAG_PMC+MIdcBATA_PMC
MindCA_PMC=−15 Nm+140 Nm=+125 Nm The same action is taken for the margins MindCB of the secondary channel CB.

Preferably, when one of the members has no specific power limit over a given time horizon, the method uses the power margin of the next higher time horizon. For example, the margin PMD of the gas turbine TAG for the calculation of the margin MindCA_2 mn. Similarly, the margin PMC of the batteries BATA, BATB is used to calculate the margin MindCA_PMD.

Finally, the method comprises a step of comparing the power margins of the sources with the power margins of the consumers. In the nominal situation of the example, the power margin of the motors is the lowest. Therefore, the limitation corresponding to the drive element with the lowest margins is applied. The power margins of the drive system indicated according to the method according to the invention are therefore:

MH1_2 mn=min(MindCA_2 mn; MM1A_2 mn)+min (MindCB_2 mn: MM1B_2 mn)

MH1_2 min=+122 Nm-min (169.4 Nm; 61 Nm)+min (169.4; 61 Nm)

MH1_PMD=min(MindCA_PMD: MM1A_PMD)+min (MindCB_PMD; MM1B_PMD)

MH 1PMD=+97 Nm=min(151.4 Nm; 48.5 Nm)+min (151.4; 48.5 Nm)

MH1_PMC=min(MindCA_PMC; MM1A_PMC)+min (MindCB_PMC; MM1B_PMC)

MH1_PMC=+97 Nm=min(125 Nm; 48.5 Nm)+min(125; 48.5 Nm)

Without detailing the calculations similar to above, assuming that the motors M2A-M2B have the same power margins, the following results, by way of example are obtained MH2_2 min=132 Nm; MH2_PMD=107 Nm; MH2_PMC=107 Nm As shown in FIG. 3, the different individual power margins may be displayed on the aircraft dashboard to inform the pilot of the power reserve and the maneuvers that may be performed. The various power margins may also be stored on the motor calculator CAL for use by an autopilot, The interpretation that may be made of these margins is that the pilot has an instantaneous power reserve corresponding to a torque of +122 Nm for a time of 2 mn, and +97 Nm permanent on the H1 propeller, to perform all possible maneuvers, whether to accelerate or take altitude or modify the attitude of the aircraft. The pilot must distribute this available power margin among these different maneuvering possibilities so that the overall maneuver respect all the individual margins of all propellers.

The pilot is also aware that he/she will be able to carry out all the maneuvers he/she wishes, without limitation, as long as he/she simultaneously maintains positive individual margins, Advantageously, a method of controlling an aircraft, comprising a hybrid drive train, may be implemented in a secure manner by means of a control system that may be manual or automatic.

Figure 7:
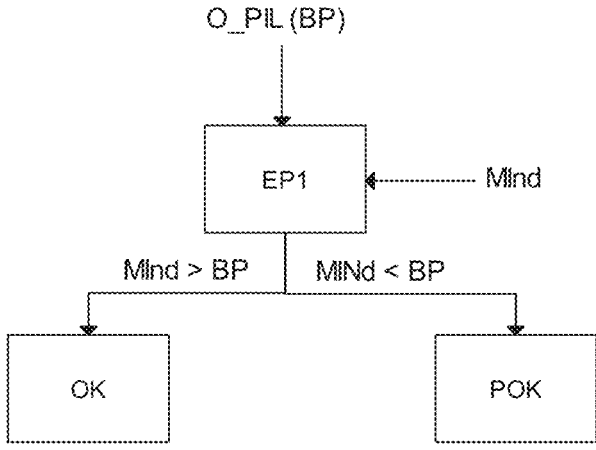

In reference to FIG. 7, the control system is configured to determine a control order O_PIL of the aircraft that is associated with a power requirement BP. Indeed, in a known way, each control order O_PIL requires more or less power according to the nature of the order (avoidance, take-off, acceleration, etc.).

The control method comprises a step of determining at least one minimum power margin of the drive train by a method such as presented previously, in particular, the individual minimum power margin Mind.

The control method comprises a step of validating the control order O_PIL if the power requirement BP is less than the minimum power margin Mind and, preferably, a step of rejecting the control order O_PIL if the power requirement BP is greater than the minimum power margin Mind. Therefore, control orders O_PIL, which may be accepted dynamically during aircraft flight, are provided reactively, in anticipation.

The invention claimed is:

1. A method for determining at least one minimum power margin of a hybrid drive train for an aircraft, the hybrid drive train comprising a plurality of power sources of different natures, a plurality of power consumers and a plurality of drive elements, each of the plurality of drive elements being associated with at least one of the plurality of power sources and at least one of the plurality of power consumers, the method comprising:

acquiring measurements of a plurality of power parameters of the hybrid drive train using a calculator, at least two of the measurements being expressed according to different units of measure, comparing each of the measurements with at least one limitation threshold, determined respectively for each of the plurality of power parameters from a threshold database using the calculator, in order to deduce therefrom at least one gross power margin for each of said plurality of power parameters, converting from a transformation database including a transformation ratio database, the at least one gross power margin of said plurality of power parameters into refined power margins expressed according to a same common unit of measure using the calculator, transposing from a yield database, the refined power margins into standardized power margins at an at least one reference point of the hybrid drive train using the calculator, the yield database storing predetermined yield ratios for a plurality of transmission members including at least an electric generator configured to convert mechanical power from a turbogenerator to electrical power, at least one rectifier configured to convert alternating current to direct current, at least one electrical channel configured to transport electrical power, at least one inverter configured to convert direct current to alternating current, and at least one electric motor configured to convert electrical power to mechanical power, wherein the yield database determines yields of the plurality of transmission members that are between an acquisition point and the at least one reference point by multiplying the predetermined yield ratios of the plurality of transmission members that are between the acquisition point and the at least one reference point, determining a source power margin, from the standardized power margins of the plurality of power sources at said at least one reference point, and a consumer power margin, from the standardized power margins of the plurality of power consumers at said reference point using the calculator, determining the minimum power margin by selecting a lowest power margin between the consumer power margin and the source power margin at said at least one reference point using the calculator, and controlling the plurality of transmission members of the hybrid drive train for the aircraft based on the selected lowest power margin.

2. The method according to claim 1, wherein the at least one reference point corresponds to one or more of the plurality of drive elements.

3. The method according to claim 1, wherein when the plurality of power sources supply several of the plurality of power consumers in parallel, it is assumed that a total power received in a node is equally distributed among the plurality of power consumers.

4. The method according to claim 1, wherein when the plurality of power sources supply several of the plurality of power consumers in parallel, a total power received in a node is distributed in a weighted manner among the plurality of power consumers.

5. The method according to claim 1, wherein the plurality of power sources comprises at least one turbogenerator and at least one electric battery.

6. The method according to claim 1, wherein the hybrid drive train comprises a plurality of electric motors as the plurality of power consumers.

7. The method according to claim 1, wherein for the aircraft, the individual power margins are grouped along main axes of the aircraft so as to indicate roll, pitch, and yaw margins.

8. A method of controlling an aircraft, comprising a hybrid drive train, by means of a control system, the method comprising:

determining a control order of the aircraft by the control system, the control order being associated with a power requirement, determining the at least one minimum power margin of the hybrid drive train by the method according to claim 1, and validating the control order if the power requirement is less than the minimum power margin.

9. A hybrid drive train for an aircraft, the hybrid drive train comprising a plurality of power sources, a plurality of power consumers and a plurality of drive elements, each of the plurality of drive elements being associated with at least one of the plurality of power sources and at least one of the plurality of power consumers, the hybrid drive train comprising at least one calculator and databases accessible by the calculator, the calculator being configured to:

acquire measurements of a plurality of power parameters of the hybrid drive train, at least two of the measurements being expressed according to different units of measure, compare each of the measurements with at least one limitation threshold, determined respectively for each of the plurality of power parameters from a threshold database, so as to deduce therefrom at least one gross power margin for each of said plurality of power parameter, convert from a transformation database including a transformation ratio database, the gross power margins of each of said plurality of power parameters into refined power margins expressed according to a same common unit of measure, transpose from a yield database, the refined power margins into standardized power margins at an at least one reference point, the yield database storing predetermined yield ratios for a plurality of transmission members including at least an electric generator configured to convert mechanical power from a turbogenerator to electrical power, at least one rectifier configured to convert alternating current to direct current, at least one electrical channel configured to transport electrical power, at least one inverter configured to convert direct current to alternating current, and at least one electric motor configured to convert electrical power to mechanical power, wherein the yield database determines yields of the plurality of transmission members that are between an acquisition point and the at least one reference point by multiplying the predetermined yield ratios of the plurality of transmission members that are between the acquisition point and the at least one reference point, determine a source power margin, from the standardized power margins of the plurality of power sources at the said the at least one reference point, and a consumer power margin, from the standardized power margins of the plurality of power consumers at said at least one reference point, determine the minimum power margin by selecting a lowest power margin between the consumer power margin and the source power margin at said at least one reference point, and controlling the plurality of transmission members of the hybrid drive train based on the selected lowest power margin.

10. The aircraft, comprising:

the at least one hybrid drive train according to claim 9.

* * * * *